Oct. 20, 1959     F. A. BURTZLOFF     2,909,387
CONVERTIBLE ATTACHMENT FOR LOAD CARRYING BODY
Filed Jan. 20, 1959             2 Sheets-Sheet 1
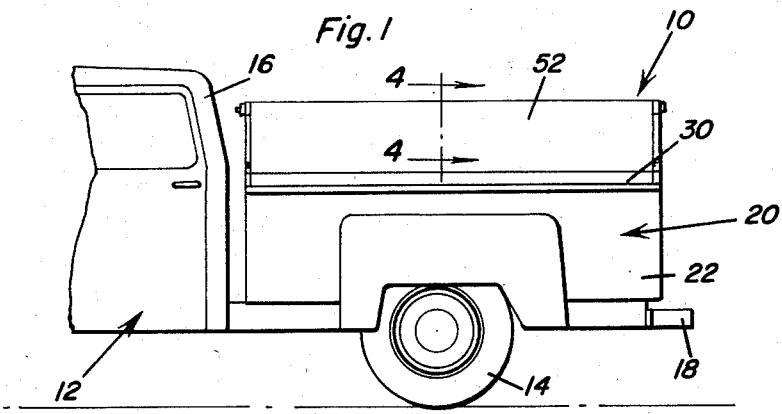
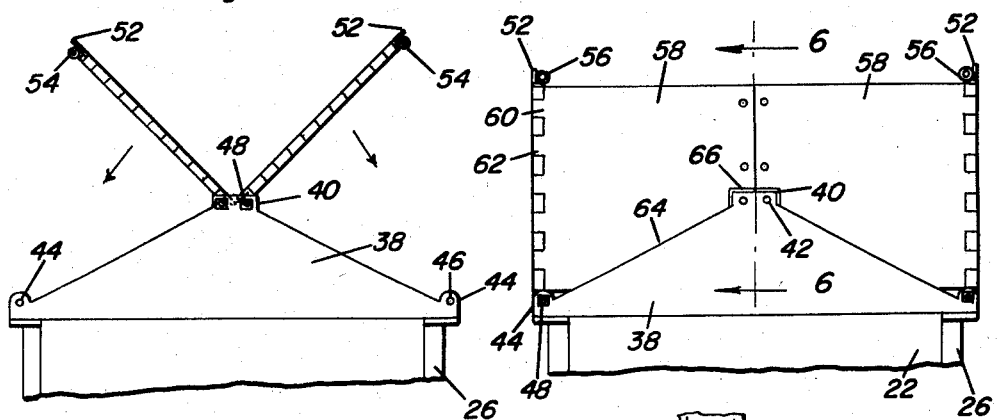
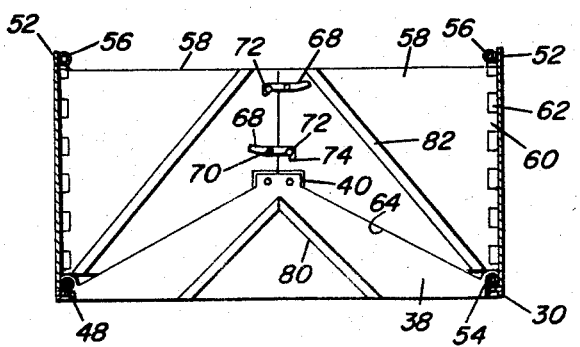
Fred A. Burtzloff
INVENTOR.

Oct. 20, 1959 F. A. BURTZLOFF 2,909,387
CONVERTIBLE ATTACHMENT FOR LOAD CARRYING BODY
Filed Jan. 20, 1959 2 Sheets-Sheet 2
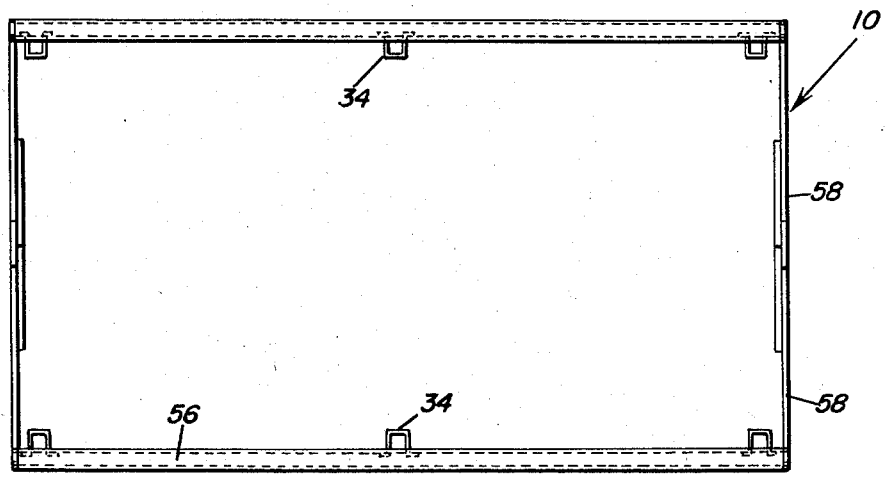
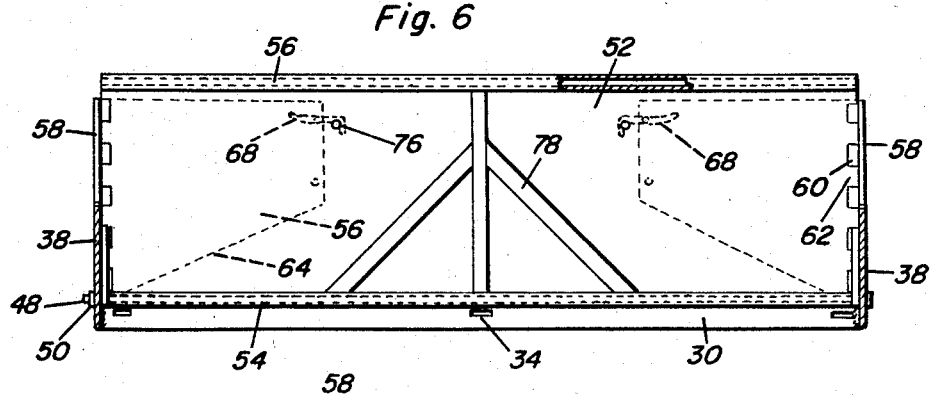
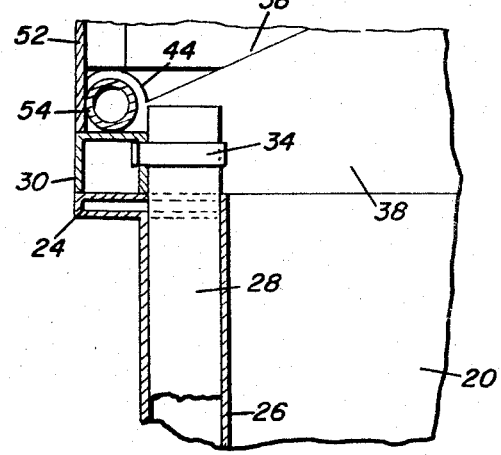
Fred A. Burtzloff
INVENTOR.
BY *Clarence A. O'Brien*
*and Harvey B. Jacobson*
Attorneys

2,909,387
CONVERTIBLE ATTACHMENT FOR LOAD CARRYING BODY

Fred A. Burtzloff, Three Oaks, Mich.

Application January 20, 1959, Serial No. 787,948

5 Claims. (Cl. 296—10)

The present invention generally relates to a vehicle attachment and more particularly to such an attachment adapted for use with two or four wheel vacation trailers and also pick-up trucks.

The primary object of the present invention is to provide an attachment for a vehicle body which is of a convertible nature in that it may be converted from an enlarged load carrying box having vertical sides for use in hauling grain, cattle or other goods to a body having inclined roof sections which are locked together in closed relation thus completely enclosing the goods being carried to protect the same from the weather elements and also to protect the same from possible theft. The device also permits easy conversion from one unit to another and when in the closed position, either side of the closed top may be raised up from the lower edge thereof for permitting easy access to the goods within the enclosure. Further, the attachment of the present invention is easily removed and easily placed on the vehicle body to which the same is attached.

Therefore, it is a further object of the present invention to provide a load carrying body in the form of an attachment for a vehicle body in accordance with the preceding objects and which is simple in construction, easy to attach, easy to remove, easy to convert from one type of load carrying body to another type of load carrying body, dependable in operation, long lasting, utilitarian and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation of a pick-up truck with the load carrying body of the present invention attached thereto with the load carrying body illustrated in a condition with the side walls thereof arranged vertically;

Figure 2 is an end elevation of the load carrying body illustrating the manner in which the inclined wall members are hingedly attached at the top and detachable at the bottom edge;

Figure 3 is an end elevation of the load carrying body in which the walls are disposed vertically;

Figure 4 is a sectional view taken substantially upon a plane passing along section line 4—4 of Figure 1 illustrating the structural details of the load carrying body;

Figure 5 is a bottom plan view of the load carrying body;

Figure 6 is a longitudinal, vertical sectional view taken substantially upon a plane passing along section line 6—6 of Figure 3;

Figure 7 is a detailed sectional view illustrating the manner in which the load carrying body is attached to a pick-up truck body; and Figure 8 is a detailed sectional view illustrating further structural details of the clips for retaining the load carrying body in position.

Referring now specifically to the drawings, the numeral 10 generally designates the load carrying body of the present invention which is illustrated in Figure 1 as being attached to a pick-up truck generally designated by the numeral 12 and which includes the usual rear driving wheels 14, the cab 16, rear bumper 18 and load receiving body generally designated by the numeral 20 and including vertical walls 22 having outwardly extending flanges or ledges 24 at the upper end thereof and including vertically extending sockets 26 for receiving vertical stakes 28.

The load carrying body attachment of the present invention includes a pair of side angle iron members or side rails 30 which rest against the flanges 24 and which include openings 32 in the inner leg thereof. The side rails 30 are preferably of channel-shaped construction with the open edge of the channel facing downwardly and the opening 32 in the inner leg thereof adjacent the upper edge thereof. Supported in each opening 32 is a substantially U-shaped clip 34 having the inner ends of the legs extending outwardly as indicated by the numeral 36 thus retaining the clips 34 within the opening 32. The clips 34 are generally polygonal in shape for alignment with the sockets 26 when the side rail 30 is resting on the flange 24 thus receiving the upper end of a stake 28 received in the socket 26 thus mounting the side rails 30 on the vehicle body 20.

The ends of the side rails 30 are rigidly interconnected by a pair of end members 38 both of which are substantially triangular in configuration with the elongated base forming the bottom edge of the body and generally overlying and engaging the end walls of the vehicle truck body 20. The apex of each triangular end 38 is provided with a generally rectangular projection 40 each having a pair of apertures 42 therein.

Each end of each end member 38 is provided with an upstanding projection 44 having an opening 46 therein. The openings 42 and 46 are adapted to receive elongated rods 48 which may be headed on one end and provided with a nut 50 on the other end thereof for a purpose described hereinafter.

There are provided two enlarged and rectangular side panels 52. Each side panel 52 is provided with an elongated tubular pipe or sleeve 54 at the bottom edge thereof and a similar pipe or sleeve 56 at the top edge thereof. Thus, the side wall members 52 may be disposed in an inclined relation with the end edges thereof generally disposed alongside of the inclined edges of the end members 38. In this orientation, the rod 48 is received in aligned apertures 42 thus hinging the side wall members 52 to the apex of the end members 38 whereby the bottom edges may be swingable in a vertical plane about the axis of the rods 48 and this construction and arrangement is shown in Figure 2. By employing a similar rod through the bottom sleeve or pipe 56, the side wall members 52 which form the top of the load carrying body may be locked securely in position.

The side members 52 may also be disposed in vertical position as illustrated in Figure 3. This is accomplished by removing the rod 48 which holds the upper end of the wall member 52 to the apex of the end members 58 and inserting the same in the bottom tubular pipe 54 as clearly illustrated in Figures 3 and 6. In this orientation, the wall members 52 are disposed vertically and are held in this position by vertical end sections 58 which are provided with hinge barrel sleeves 60 on one edge thereof for matching engagement with similar sleeves 62 on the side wall members 52 with these members being interconnected by a vertical hinge pin whereby the sectional end plates or walls 58 are swingable about the end edge of the side wall members 52. The lower edges of the end plate 58 are inclined as designated by the numeral 64 for engagement and alignment with the upper edge of the end member 38. There is also provided a notch 66 for receiving the projection 40 on the end walls 38. On the inner surface of each of the end plates 38, there is provided a hinged latch member 68 mounted on pivot pin 70 and engaged over a lug 72 on the adjacent end plate 58. The latch member 68 is provided with a hook-shaped free end 74 for engaging the projection 72 thus retaining the end plate 58 in alignment and in alignment with the end wall or end member 38. The latch member 68 may be gravity operated or may be spring urged into latched position. As illustrated in Figure 6, each side wall member 52 is provided with a lug 76 which may be engaged by the latch 68 when the end plates 58 are folded to a position alongside of and against the inner surface of the side wall members 52 when the side wall members 52 are to be used in inclined relation and forming the roof closure for the load carrying attachment.

The side wall members 52 may be reinforced by reinforcing members 78, the end members 38 may be reinforced by reinforcing members 80 and the end plates 58 may be reinforced by reinforcing members 82. The entire device may be constructed of any suitable material such as sheet metal or the like which renders the same relatively inexpensive to manufacture, easy to attach, light weight, long lasting and generally well qualified for the purposes for which the same is intended.

In use, the attachment is mounted in position or removed by merely lifting the same off of the stakes 28. If the device is to be used as shown in Figures 1, 3, 4 and 7, then the end plates 58 are unfolded into alignment with each other and in alignment with the end members 38 and the latch members 68 engaged with the corresponding lugs 72. However, if the device is to be used as shown in Figure 2, then the end plates 58 are folded inwardly against the side wall members 52 as shown in dotted line in Figure 6 and the top edge of the side wall members 52 is pivotally attached to the end members 38 as shown in Figure 2.

The foregoing is considered as illustrative only of the principles of the invention. Further, since numerous modifications and changes will readily occur to those skilled in the art, it is not desired to limit the invention to the exact construction shown and described, and accordingly, all suitable modifications and equivalents may be resorted to, falling within the scope of the invention as claimed.

What is claimed as new is as follows:

1. An attachment for a vehicle body having vertically disposed stakes and horizontally disposed ledges at the upper edges of a load carrying body, said attachment including a pair of side rails adapted to be supported on said ledges, each of said side rails having inwardly extending U-shaped clips adapted to slidably engage over the stakes thus detachably mounting the side rails on the ledges and retaining the same in position, a pair of end walls rigidly interconnecting said side rails, each of said end walls being generally triangular in shape, a pair of side walls hingedly and detachably connected to the apex of the end walls with the side walls forming a closure for the upper edge of the end walls thereby forming an enclosure having a transverse area generally equivalent to the size of the end walls and forming a closure for the load carrying vehicle body to which the attachment is attached, said side walls being detachably and hingedly attached to each of said side rails thus locking the side walls in closed position when the upper edges of the side walls are detachably and hingedly connected to the apex of the end members thereby enabling the side wall members to the hinged upwardly when the connection between the lower edges of the side wall members and the side rails are released, wherein said side wall members may be pivoted to a vertical position when the detachable and hinge connection between the upper edges of the side wall members and the end members are detached, and end plates hingedly attached to each end of each side wall member for extending laterally inwardly and overlying and engaging the upper edge of the end members thereby forming an extension for the end members for providing an enclosure with vertical walls generally forming an extension of the walls of the load carrying vehicle body, and means detachably connecting the inner ends of the end plates together for retaining the same in alignment with each other and in alignment with and in engagement with the end members.

2. The structure as defined in claim 1 wherein said means detachably interconnecting the inner edges of said plate members including a latch member mounted on each plate member, a lug mounted on each plate member for engagement with a corresponding latch member whereby the latch members will retain the plate members in alignment.

3. The structure as defined in claim 2 wherein each of said side wall members is provided with a lug for engagement with the corresponding latch members when the end plates are swung inwardly against the inner surface of the side wall members thus retaining the end plates in collapsed position when the side wall members are employed in inclined relation.

4. The structure as defined in claim 3 wherein each of said hinged and detachable connections includes an elongated pipe-like sleeve on the side wall member, and lugs on the end member with apertures extending therethrough for alignment with the pipes on the side wall members, and an elongated rod insertible through the aligned apertures and pipes for forming a hinged detachable connection.

5. An attachment for a vehicle body having vertically disposed stakes and horizontally disposed ledges at the upper edges of a load carrying body, said attachment including a pair of side rails adapted to be supported on said ledges, each of said side rails having inwardly extending U-shaped clips adapted to slidably engage over the stakes thus detachably mounting the side rails on the ledges and retaining the same in position, a pair of end walls rigidly interconnecting said side rails, each of said end walls being generally triangular in shape, a pair of side walls hingedly and detachably connected to the apex of the end walls with the side walls forming a closure for the upper edge of the end walls thereby forming an enclosure having a transverse area generally equivalent to the size of the end walls and forming a closure for the load carrying vehicle body to which the attachment is attached, and means detachably attaching said side walls to said side rails comprising an elongated pipe-like sleeve on the side wall, terminal lugs on the end walls with apertures extending therethrough for alignment with the sleeves on the side walls, and elongated rods insertable through the aligned apertures and sleeves.

References Cited in the file of this patent

UNITED STATES PATENTS

| 882,743 | Carroll | Mar. 24, 1908 |
| 1,038,591 | Johnson | Sept. 17, 1912 |
| 1,639,092 | King | Aug. 16, 1927 |
| 2,757,041 | Alcorn | July 31, 1956 |
| 2,769,658 | Edmonds | Nov. 6, 1956 |
| 2,848,274 | Geisler et al. | Aug. 19, 1958 |